US009567088B2

(12) United States Patent
Godlasky et al.

(10) Patent No.: US 9,567,088 B2
(45) Date of Patent: Feb. 14, 2017

(54) VERTICAL TAKE-OFF AND LANDING AIRCRAFT

(71) Applicant: SWIFT ENGINEERING, INC., San Clemente, CA (US)

(72) Inventors: Robert Godlasky, Lake Forest, CA (US); Nate Ogawa, Lake Forest, CA (US); Andrew Streett, San Clemente, CA (US)

(73) Assignee: SWIFT ENGINEERING, INC., San Clemente, CA (US)

( * ) Notice: Subject to any disclaimer, the term of this patent is extended or adjusted under 35 U.S.C. 154(b) by 132 days.

(21) Appl. No.: 14/460,013

(22) Filed: Aug. 14, 2014

(65) Prior Publication Data

US 2015/0102157 A1 Apr. 16, 2015

Related U.S. Application Data

(60) Provisional application No. 61/891,105, filed on Oct. 15, 2013.

(51) Int. Cl.
B64D 27/02 (2006.01)
B64C 29/02 (2006.01)
B64C 39/02 (2006.01)

(52) U.S. Cl.
CPC ............ B64D 27/02 (2013.01); B64C 29/02 (2013.01); B64C 39/024 (2013.01); B64C 2201/021 (2013.01); B64C 2201/088 (2013.01); B64C 2201/102 (2013.01)

(58) Field of Classification Search
CPC ...... B64C 29/00; B64C 29/02; B64C 29/0025; B64C 2201/088; B64D 27/04; B64D 27/06; B64D 27/08
See application file for complete search history.

(56) References Cited

U.S. PATENT DOCUMENTS

| | | | | |
|---|---|---|---|---|
| 1,603,711 A | * | 10/1926 | Peck ................... | B64D 5/00 244/106 |
| 1,662,406 A | * | 3/1928 | Thompson .......... | B64C 29/0025 244/113 |
| 1,804,312 A | * | 5/1931 | Brown ................. | B64D 27/06 244/55 |
| 1,928,326 A | * | 9/1933 | Bratu .................. | B64D 27/08 244/55 |

(Continued)

FOREIGN PATENT DOCUMENTS

DE 2421627 A1 11/1975
WO 2011066400 A1 6/2011

OTHER PUBLICATIONS

Boeing, Heliwing Aircraft, 1995.

(Continued)

Primary Examiner — Joseph W Sanderson
(74) Attorney, Agent, or Firm — Perkins Coie LLP

(57) ABSTRACT

A VTOL aircraft includes at least one puller rotor and at least one pusher rotor. The VTOL aircraft, for example, may include three puller rotors and one pusher rotor. The combination of static puller and pusher rotors allows the rotors to remain in a fixed orientation (i.e., no moving mechanical axes are required) relative to the wings and fuselage of the VTOL aircraft, while being able to transition the aircraft from a substantially vertical flight path to a substantially horizontal flight path.

18 Claims, 5 Drawing Sheets

(56) References Cited

U.S. PATENT DOCUMENTS

| | | | | |
|---|---|---|---|---|
| 2,014,377 | A * | 9/1935 | Fitzgerald | B64C 29/0025 244/12.3 |
| D113,019 | S * | 1/1939 | Silverstein | 244/13 |
| 2,481,502 | A * | 9/1949 | Downing | B64C 29/0025 244/6 |
| 2,678,783 | A * | 5/1954 | Myers | B64C 29/0091 244/102 R |
| 3,142,455 | A | 7/1964 | Wilford | |
| 5,765,783 | A * | 6/1998 | Albion | B64C 29/02 244/17.23 |
| 5,782,427 | A * | 7/1998 | Hermach | B64D 27/08 244/120 |
| 5,823,468 | A | 10/1998 | Bothe | |
| 5,890,441 | A * | 4/1999 | Swinson | B64C 29/0025 244/12.1 |
| 6,098,927 | A | 8/2000 | Gevers | |
| 6,367,738 | B1 * | 4/2002 | Wadleigh | B64C 39/04 244/13 |
| 6,561,455 | B2 | 5/2003 | Capanna et al. | |
| 6,655,631 | B2 | 12/2003 | Austen-Brown et al. | |
| 8,256,704 | B2 * | 9/2012 | Lundgren | B64C 29/0033 244/7 C |
| 8,602,348 | B2 * | 12/2013 | Bryant | B64C 29/0033 244/12.4 |
| 2002/0074452 | A1 | 6/2002 | Ingram et al. | |
| 2004/0026563 | A1 * | 2/2004 | Moller | B64C 3/56 244/12.4 |
| 2005/0178879 | A1 | 8/2005 | Mao et al. | |
| 2009/0045295 | A1 * | 2/2009 | Lundgren | B64C 29/0033 244/7 C |
| 2011/0042509 | A1 | 2/2011 | Bevirt et al. | |
| 2011/0315806 | A1 | 12/2011 | Piasecki et al. | |
| 2012/0091257 | A1 | 4/2012 | Wolff et al. | |
| 2012/0286102 | A1 | 11/2012 | Sinha et al. | |
| 2013/0206921 | A1 | 8/2013 | Paduano et al. | |
| 2015/0102157 | A1 | 4/2015 | Godlasky et al. | |
| 2015/0225071 | A1 * | 8/2015 | Tighe | B64C 29/02 244/12.4 |

OTHER PUBLICATIONS

LAK, "LAK Genesis 2 Glider", https://en.wikipedia.orgiwiki/LAK_Genesis_2, 1994, 2.
Stone, H., Clarke, G. "Optimization of Transition Maneuvers for a Tail-Sitter Unmanned Air Vehicle (UAV)", Australian International Aerospace Congress, Paper 105, Canberra, Mar. 2001,14 pgs.
Stone, et al., "Preliminary Design of a Tandem-Wing Tail-Sitter UAV Using Multi-Disciplinary Design Optimisation", Intl Aerospace Congress, Sydney, AU, Feb. 1997, 707-720.
Stone, et al., "The T-Wing: A VTOL UAV for Defense and Civilian Applications", UAV Australia Conference, Melbourne, AU, Feb. 2001, 13 pgs.
University of Sydney, "University of Sydney T-Wing Website", http://www.aeromech.usyd.edu.au/uav/twing/, Sep. 2002.
USPTO, "International Search Report and Written Opinion", for PCT/US14/60166, Jun. 25, 2015, 11 pgs.
Advanced VTOL Technologies, "Products: Hammerhead VTOL Aircraft", http://www.avtolt.com/products/hammerhead.php, exact publication date unknown (web page last visited Mar. 22, 2016).
Carey, Bill, "Helicopter Operator Places Launch Order for Flexrotor UAV", Aviation International News Online, http://www.ainonline.com/aviation-news/aerospace/2015-01-05/helicopter-operator-places-launch-order-flexrotor-uav, Jan. 15, 2015.
Eshel, Tamir, "Sikorsky, Aurora Flight Sciences to Develop VTOL X-Planes for DARPA", Defense Update, http://defense-update.com/20131213_sikorsky-aurora-flight-sciences-develop-vtol-x-planes-darpa.html, Dec. 13, 2013.
Industry Network Engineering and Services, "Unmanned aircraft", Industry Network Engineering and Services, http://www.industry.co.jp/ines/, exact publication date unknown, (web page last visited Mar. 18, 2016).
Japan Aerospace Exploration Agency, "Four-engine tilt wing VTOL aircraft", Aeronautical Technology Directorate, http://www.aero.jaxa.jp/eng/research/frontier/vtol/qtw/, exact publication date unknown (web page last visited Mar. 22, 2016).
Krossblade Aerospace Systems LLC, "Krossblade SkyProwler Multi-Mission VTOL Transformer Drone", Kickstarter Campaign, https://www.kickstarter.com/projects/350745213/krossblade-skyprowler-multi-mission-vtoltransform/updates, exact publication date unknown, (web page last visited Mar. 18, 2016).
Lee, R.E., "Convair XFY-1 Pogo", National Air and Space Museum, http://airandspace.si.edu/collections/artifact.cfm?object=nasm_A19730274000, Sep. 18, 2000.
Liszewski, Andrew, "Tilting Wings Let This New Air Hogs RC Plane Hover Like a Helicopter", Toyland Blog, http://toyland.gizmodo.com/tilting-wings-let-this-new-air-hogs-rc-plane-hover-like-1720002243, Jul. 24, 2015.
Madrigal, Alexis C., "Inside Google's Secret Drone-Delivery Program", The Atlantic, http://www.theatlantic.com/technology/archive/2014/08/inside-googles-secret-drone-delivery-program/379306/, Aug. 28, 2014.
Moore, Mark D., "NASA Puffin Electric Tailsitter VTOL Concept", NASA Technical Reports Server, http://ntrs.nasa.gov/archive/nasa/casi.ntrs.nasa.gov/20110011311.pdf, Sep. 13, 2010.
RC Groups, "Discussion: Tail Sitting VTOL," http://www.rcgroups.com/forums/showthread.php?t=1473333&page=4, Aug. 9, 2011.
SUAS News, "Arcturus UAV Upgrades the JUMP15 VTOL UAV", sUAS News, http://www.suasnews.com/2014/12/arcturus-uav-upgrades-the-jump15-vtol-uav/, Dec. 5, 2014.
SUAS News, "Sony Ventures Unveils Drone Prototype", sUAS News, http://www.suasnews.com/2015/08/sony-venture-unveils-drone-prototype/, Aug. 24, 2015.
SUAS News, "The Airbus Group's Quadcruiser concept is validated in flight tests", sUAS News, http://www.suasnews.com/2014/12/the-airbus-groups-quadcruiser-concept-is-validated-in-flight-tests/, Dec. 8, 2014.
SUAS News, "Vertex VTOL UAV", sUAS News, http://www.suasnews.com/2014/12/vertex-vtol-uav/, Dec. 26, 2014.
Wikipedia, "Tail-sitter", https://en.wikipedia.org/wiki/Tail-sitter, exact publication date unknown, (web page last visited Mar. 18, 2016).
XCraft, "X PlusOne", http://xcraft.io/x-plusone-drone/, exact publication date unknown, (web page last visited Mar. 18, 2016).
Xylakantsky, Ivan, "Chinese VTOL UAV VMA-01", YouTube, https://www.youtube.com/watch?v=GNTZ14ecUs8, Jun. 6, 2012.

* cited by examiner

_US 9,567,088 B2_

VERTICAL TAKE-OFF AND LANDING AIRCRAFT

PRIORITY CLAIM

This application claims the benefit of U.S. Provisional Patent Application No. 61/891,105, filed Oct. 15, 2013, which is incorporated herein by reference in its entirety.

TECHNICAL FIELD

Certain embodiments relate to aircraft. More specifically, certain embodiments relate to methods and systems for vertical take-off and landing ("VTOL") aircraft.

BACKGROUND

Airplanes require long runways for take off and landing but this is not always ideal. In many situations, it would be preferable to take off or land in a confined space, as in areas where a runway is not available or cannot be used. Although helicopters, including electric helicopters, provide such take-off and landing capability, the tradeoff is severely decreased range and speed as compared to airplanes. For example, electric helicopters, quadcopters, and the like are generally limited to about 15-30 minutes of flight. There are several other limitations and disadvantages to these conventional approaches, as well.

SUMMARY

A VTOL aircraft includes at least one puller rotor and at least one pusher rotor. The VTOL aircraft, for example, may include three puller rotors and one pusher rotor. The combination of static puller and pusher rotors allows the rotors to remain in a fixed orientation (i.e., no moving mechanical axes are required) relative to the wings and fuselage of the VTOL aircraft, while being able to transition the aircraft from a substantially vertical flight path to a substantially horizontal flight path. Other features and advantages will appear hereinafter. The features described above can be used separately or together, or in various combinations of one or more of them.

BRIEF DESCRIPTION OF THE DRAWINGS

In the drawings, wherein the same reference number indicates the same element throughout the views.

DETAILED DESCRIPTION OF THE DRAWINGS

Figure 1:
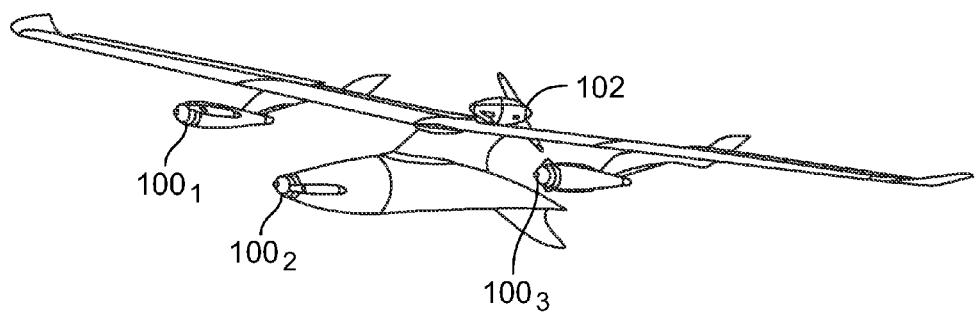
FIG. 1 is a first perspective view of an example VTOL aircraft in forward flight.
Figure 2:
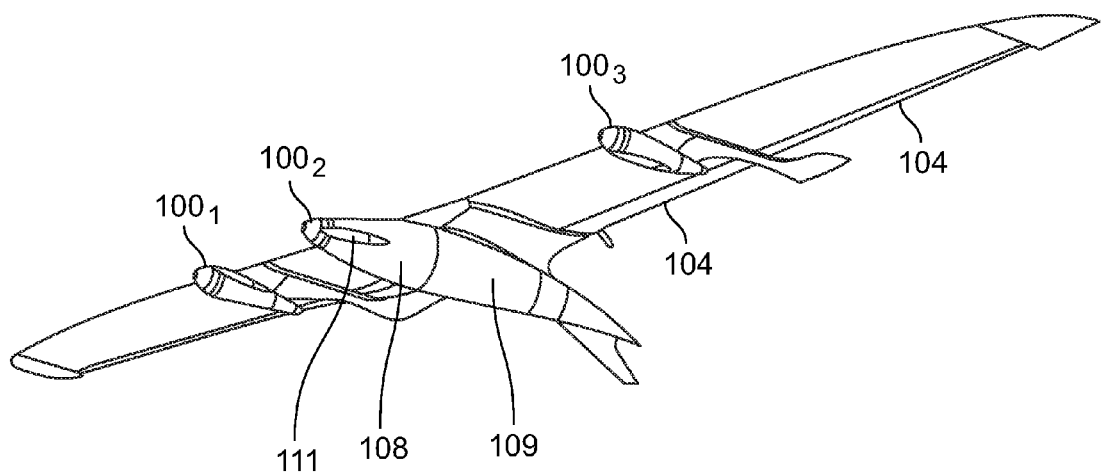
FIG. 2 is a second perspective view of an example VTOL aircraft in forward flight.
Figure 3:
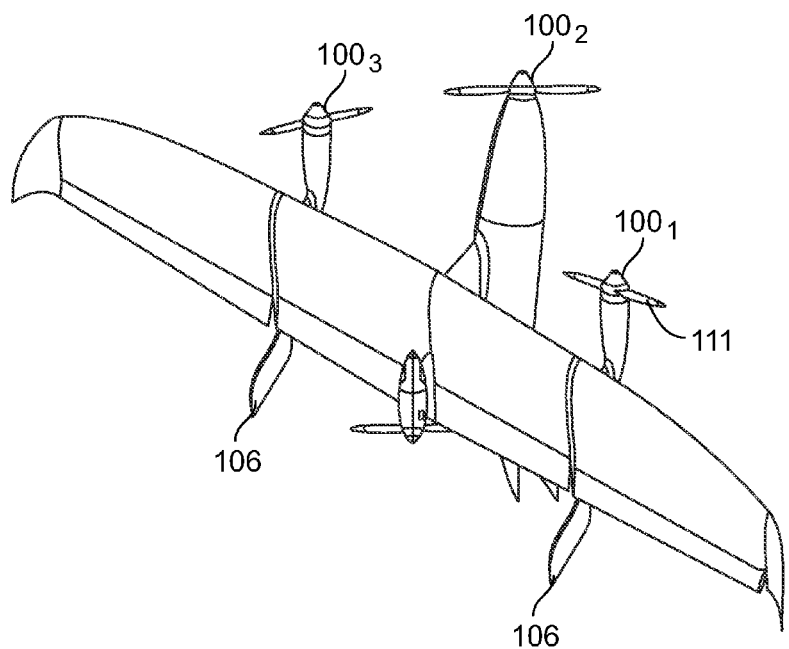
FIG. 3 is a first perspective view of an example VTOL aircraft in takeoff/landing/hover attitude.
Figure 4:
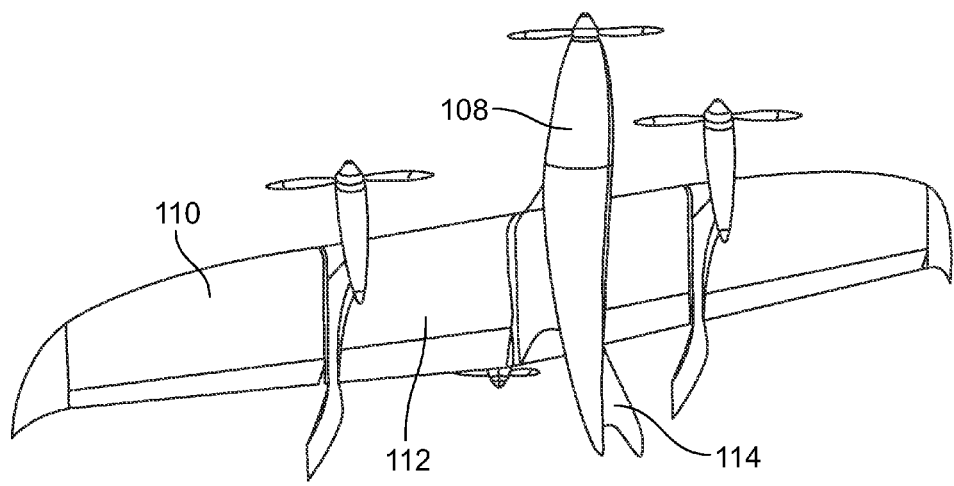
FIG. 4 is a second perspective view of an example VTOL aircraft in takeoff/landing/hover attitude.
Figure 5:
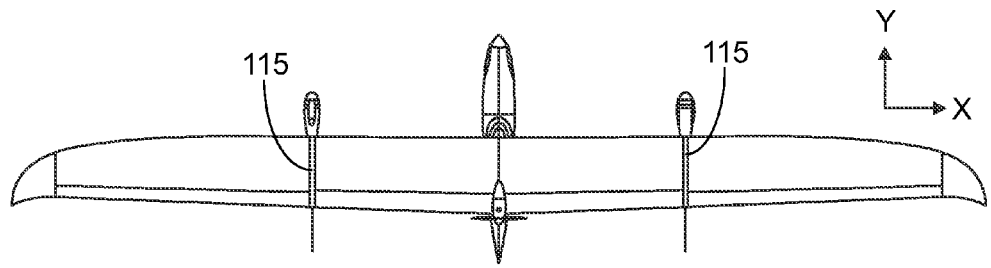
FIG. 5 is a top view of an example VTOL aircraft in forward flight.
Figure 6:
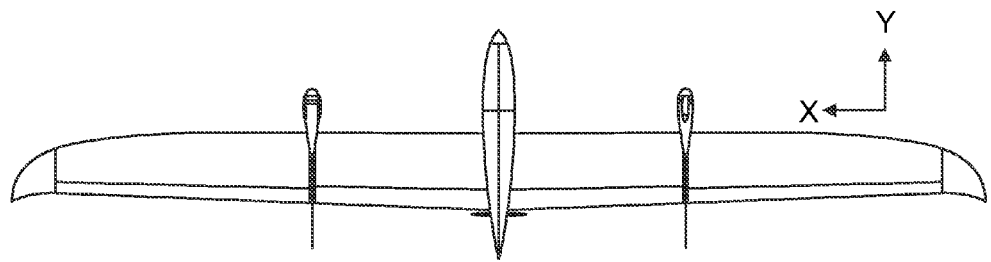
FIG. 6 is a bottom view of an example VTOL aircraft in forward flight.
Figure 7:
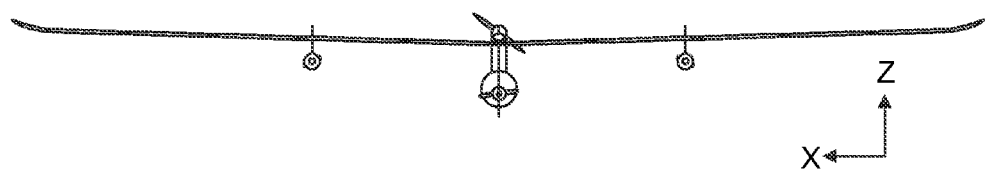
FIG. 7 is a front view of an example VTOL aircraft in forward flight.
Figure 8:
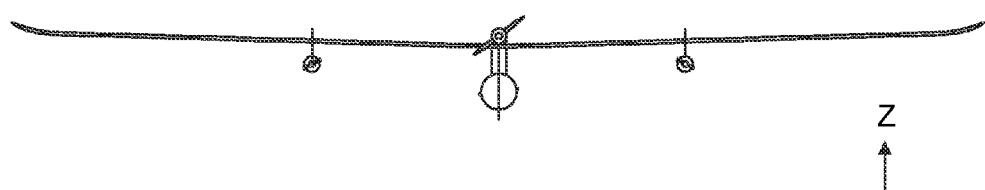
FIG. 8 is a rear view of an example VTOL aircraft in forward flight.
Figure 9:
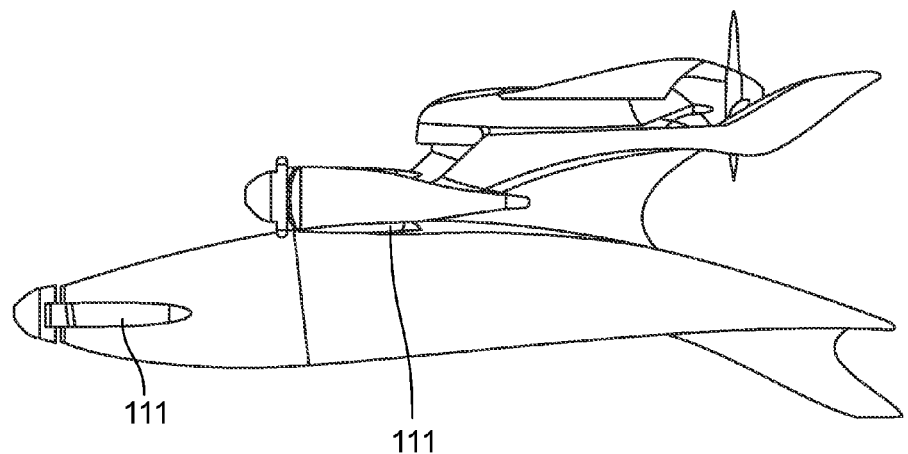
FIG. 9 is a side view of an example VTOL aircraft in forward flight.

Various embodiments of the invention will now be described. The following description provides specific details for a thorough understanding and enabling description of these embodiments. One skilled in the art will understand, however, that the invention may be practiced without many of these details. Additionally, some well-known structures or functions may not be shown or described in detail so as to avoid unnecessarily obscuring the relevant description of the various embodiments.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this detailed description section.

Where the context permits, singular or plural terms may also include the plural or singular term, respectively. Moreover, unless the word "or" is expressly limited to mean only a single item exclusive from the other items in a list of two or more items, then the use of "or" in such a list is to be interpreted as including (a) any single item in the list, (b) all of the items in the list, or (c) any combination of items in the list. Further, unless otherwise specified, terms such as "attached," "connected," or "interconnected" are intended to include integral connections, as well as connections between physically separate components.

As utilized herein, the term "exemplary" means serving as a non-limiting example, instance, or illustration. As utilized herein, the term "for example" sets off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

As utilized herein, the terms "circuits" and "circuitry" refer to physical electronic components (i.e. hardware) and any software or firmware ("code") that may configure the hardware, be executed by the hardware, or otherwise be associated with the hardware. As used herein, for example, a particular processor and memory may comprise a first "circuit" when executing a first one or more lines of code, and may comprise a second "circuit" when executing a second one or more lines of code.

Turning now to the drawings, an example VTOL aircraft is shown in FIGS. 1-9 and 11. The VTOL aircraft includes three forward-facing ("tractor" or "puller") rotors $100_1$-$100_3$, one rear-facing ("pusher") rotor 102, multiple (for example, two per wing) aileron control surfaces 104, multiple vertical stabilizers (for example, two outer stabilizers 106 and an inner stabilizer 114), a fuselage 108 including a payload bay 109, and two wings each including an outer portion 110 (portion further from the fuselage than the wing-mounted rotor 100) and an inner portion 112 (portion closer to the fuselage than the wing-mounted rotor 100). Any other suitable number of rotors, wings, or other components may be used. For example, a single, one-piece wing may be used in place of the two wings illustrated in the figures.

Inclusion of the payload bay 109 below the wings effectively lowers the center of gravity of the VTOL aircraft. As a result, the pulling rotors $100_1$-$100_3$ may be positioned below the wings without negatively affecting the stability or balance of the VTOL aircraft during flight. In this embodiment, the pusher rotor 102 may be positioned above the wings to further promote stability and balance. In an alternative embodiment, one or more of the puller rotors $100_1$-$100_3$ may be positioned above the wings, and the pusher rotor 102 may optionally be positioned below the wings.

In one embodiment, the VTOL aircraft may land on and take off from the vertical stabilizers 106 and 114 (i.e., it may be a "tail sitter"). Further, the VTOL aircraft may optionally include additional control elements. For example, each wing of the VTOL aircraft may include one or more aileron control surfaces in combination with one or more elevators, or it may include one or more elevons. For ease of description, as used herein, the terms "aileron" or "aileron control surface" will be used to cover ailerons, or ailerons in combination with elevators, or elevons.

Figure 11:
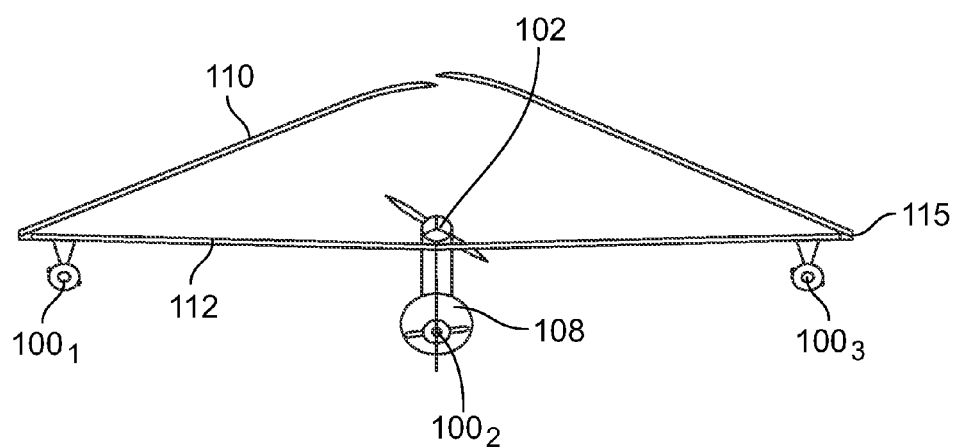
FIG. 11 is a front view of an example VTOL aircraft with its wings folded into an upward orientation.

The wings may be foldable to reduce drag, particularly during vertical flight. In one embodiment, as shown in FIG. 11 for example, the wings may be upwardly foldable about hinges 115. The hinges 115 may be positioned generally above the puller rotors $100_1$ and $100_3$ or in another suitable location. When the wings are folded upward in this manner, the cross-sectional area of the aircraft that may be subjected to wind-loading is reduced. The wings may alternatively be foldable in any other suitable manner to reduce drag. For example, structural hinges may be omitted and the wings may be foldable about themselves, or about a living hinge.

The three puller rotors $100_1$-$100_3$ may be configured so that their propellers 111 are retractable during flight. The retracted propellers 111 present less drag during forward flight, for example, than they would if left extended. The propellers 111 of puller rotors $100_1$-$100_3$ are shown extended in FIGS. 3 and 4 and retracted in FIGS. 1-2, 5-9, and 11.

One advantage of the example VTOL aircraft is that use of one pusher rotor 102 and one puller rotor $100_2$ along the centerline of the fuselage 108 allows the rotors 102 and $100_2$ to be positioned closer together than if both rotors 102 and $100_2$ were puller rotors. That is, using the coordinates shown in FIGS. 5-8, the rotors $100_2$ and 102 may be positioned closer together along the y-axis than they could be if rotor 102 were replaced by a puller rotor since, for a puller rotor, the propeller would be at the other end of rotor 102 closer to the propeller of rotor $100_2$. The relative proximity (in the Y direction of the coordinate system of FIGS. 5-8) of the rotors $100_2$ and 102 may reduce drag, reduce the overall footprint of the aircraft, and increase the efficiency of the aircraft during forward flight.

In one embodiment, the rotors $100_2$ and 102 may be larger and more powerful than the rotors $100_1$ and $100_3$. Larger, more powerful rotors may be used for the rotors $100_2$ and 102 because they are closer to the center of the VTOL aircraft and thus have a relatively small moment arm, whereas the rotors $100_1$ and $100_3$ have a relatively large moment arm.

In operation, the four rotors $100_1$-$100_3$ and 102 may be powered on for take-off. During the hover attitude, the four rotors $100_1$-$100_3$ and 102 are used for stability and navigation. Increasing or decreasing thrust to some or all rotors allows it to move in a similar manner to that of a four-rotor helicopter. Once sufficient altitude is reached, a graceful transition from vertical take-off to forward flight may be achieved by intelligently controlling thrust to the rotors $100_1$-$100_3$ and 102 or controlling the position of the aileron control surfaces 104. The intelligent control of the rotors and ailerons may be performed by an electronic system such as the one described below with reference to FIG. 10.

For example, to make the transition from vertical take-off to forward flight, rotor $100_2$ may be turned off, such that the thrust of rotor 102 pushes the aircraft into a horizontal position. Once this horizontal position is reached, the pusher rotor 102 may be turned off, while rotors $100_1$ and $100_3$ remain on, to continue with horizontal flight. To return to vertical flight for landing, rotor $100_2$ may be turned back on to pull the aircraft into a vertical position. Once this vertical position is reached, the rotor 102 may be turned on to continue with vertical landing.

Alternatively, to make the transition from vertical take-off to forward flight, rotor $100_2$ may be turned off, such that the thrust of rotor 102 pushes the aircraft into a horizontal position. Once this horizontal position is reached, the rotors $100_1$ and $100_3$ may be turned off, while the pusher rotor 102 remains on, to continue with horizontal flight. To return to vertical flight for landing, either rotor $100_2$, or rotors $100_1$ and $100_3$, may be turned back on to pull the aircraft into a vertical position. Once this vertical position is reached, whichever rotors remained off (either $100_1$ and $100_3$, or $100_2$) may be turned on to continue with vertical landing.

Because of this ability to transition from vertical flight to forward flight without tilting any of the rotors, another advantage of the VTOL aircraft shown in FIGS. 1-9 is that the rotors $100_1$-$100_3$ and 102 may remain in a fixed orientation relative to the wings and fuselage 108. As a result, there is no need for complex, costly, and heavy components to enable the rotors to rotate or tilt between a first orientation (relative to the wings or fuselage) and a second orientation (relative to the wings or fuselage).

In an example implementation, when the transition to forward flight is complete, the forward-flying VTOL aircraft may be controlled (i.e. ascend, descend, and turn) by the use of ailerons 104 and the pusher rotor 102, and the rotors $100_1$-$100_3$ may be powered down with their propellers retracted. In the event of a power loss to the rotor 102, any of the puller rotors $100_1$-$100_3$ may be used to sustain flight. Alternatively, the forward-flying VTOL aircraft may be controlled by the use of ailerons 104 and the puller rotors $100_1$ and $100_3$ on the wings, while the central puller rotor $100_2$ and the pusher rotor 102 may be powered down.

Figure 10:
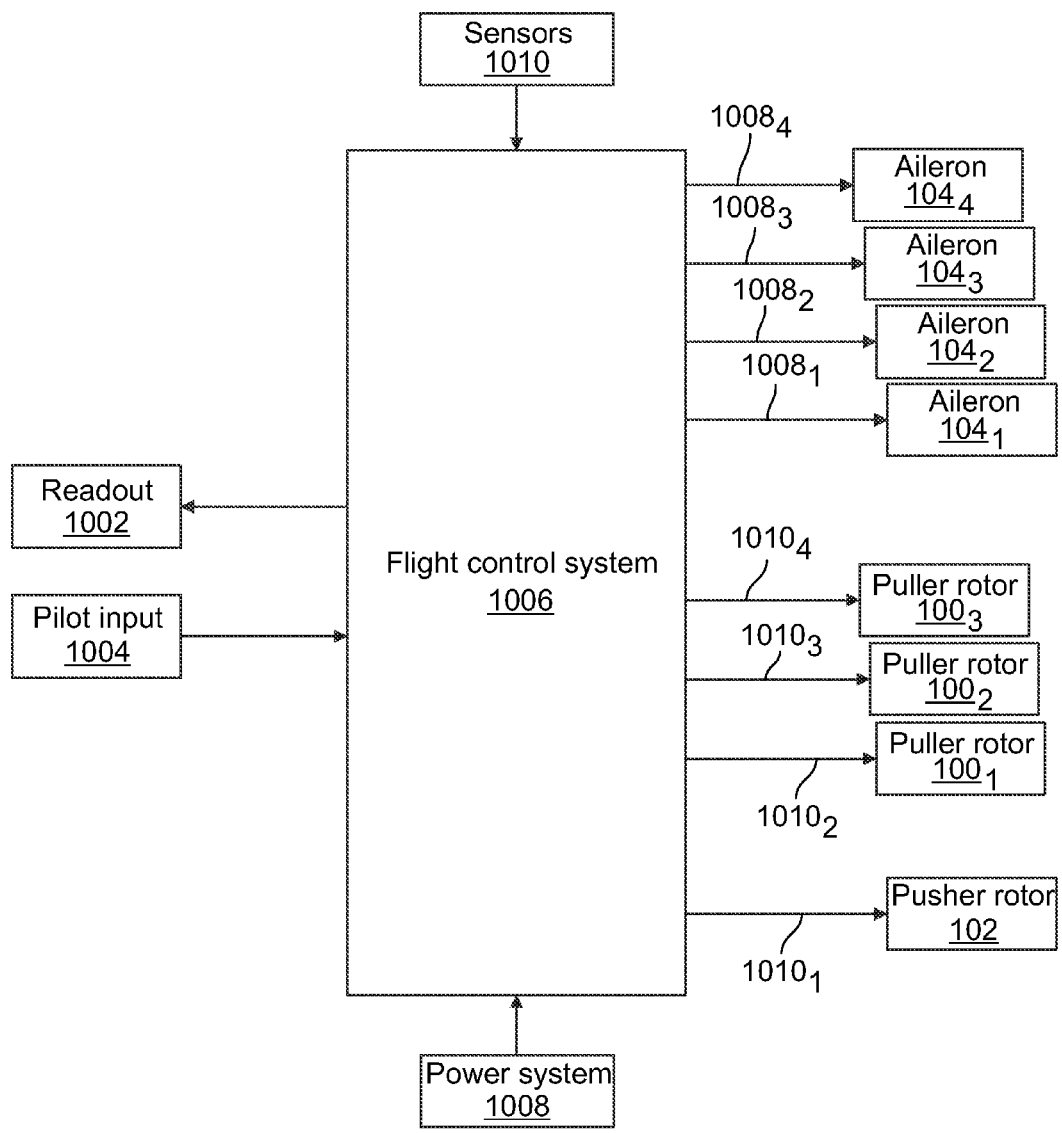
FIG. 10 is a schematic diagram of an example electronic control system of a VTOL aircraft.

FIG. 10 depicts an example electronic control system of the VTOL aircraft shown in FIGS. 1-9. The electronic control system includes readout circuitry 1002, pilot input circuitry 1004, flight control circuitry 1006, power system circuitry 1008, and sensor circuitry 1010.

The readout circuitry 1002 may be operable to present information about a status of the aircraft. The readout circuitry 1002 may include one or more displays that present information received from the VTOL aircraft. The information may include, for example: current status of each rotor $100_1$-$100_3$ and 102 (for example, RPMs, temperature, power draw, etc.); current status of power system 1008 (for example, battery charge or fuel level); current status of the ailerons $104_1$-$104_4$ (for example, position); current altitude, heading, speed, coordinates, etc. of the VTOL aircraft; current view from a camera on-board the VTOL aircraft; or the like.

The pilot input circuitry 1004 may include controls (for example, a yoke, a keyboard, or other user interface devices) for receiving pilot input and converting the pilot input to signals for transmission to the flight control circuitry 1006.

The flight control circuitry 1006 may control flight of the VTOL by controlling the ailerons $104_1$-$104_4$ and the rotors $100_1$-$100_3$ and 102. In this regard, the flight control circuitry 1006 may use information from pilot input circuitry 1004 and from sensors 1010 to generate control signals $1008_1$-$1008_4$ for controlling the ailerons $104_1$-$104_4$, and to generate control signals $1010_1$-$1010_4$ for controlling thrust of the rotors $100_1$-$100_3$ and 102. Thus, the rotors $100_1$-$100_3$ and 102 and ailerons $104_1$-$104_4$ may be intelligently controlled via signals $1008_1$-$1008_4$ and $1010_1$-$1010_4$ to achieve graceful transitions between take-off/hover/landing and forward flight.

The power system circuitry 1008 may comprise, for example, one or more batteries. In some instances, the power system circuitry 1008 may comprise a solar harvester, photovoltaics, liquid-fuel-powered generator, or other components for charging the one or more batteries.

The sensors 1010 may include, for example, temperature sensors, tachometers/encoders for the rotors $100_1$-$100_3$ and 102, position sensors for the ailerons $104_1$-$104_4$, a battery charge sensor, an altitude sensor, a camera sensor (for example, a visible spectrum or infrared camera, or an electromagnetic spectrum sensor), a ground speed sensor, a position sensor (for example, a GPS receiver), or the like.

The flight control circuitry 1006 and power system 1008 may be mounted in the payload bay 109 of the fuselage 108. Cables carrying the signals 1008 and 1010 may run along or inside the wings to the rotors $100_1$ and $100_3$ and ailerons 104. The sensors 1010 may be mounted in various positions along the fuselage, wings, rotors, ailerons, or stabilizers.

In the embodiments described herein, the VTOL aircraft includes multiple rotors (for example, four rotors) oriented in a manner to decrease frontal-face area and ultimately reduce drag in the forward flight attitude, by the use of a pusher rotor and a puller rotor oriented along the central axis or central plane of the aircraft. This arrangement allows for rotor propellers to be placed close together, whereas the propellers would otherwise collide with each other or the fuselage if they were both pusher or puller rotors. Further, the wings of the VTOL aircraft may be foldable to further reduce drag.

The flight control circuitry of the VTOL aircraft may be programmed so that the VTOL aircraft is able to take off from and land at the same location, or at another desired location, without human interaction during flight. This may be done using an augmented RTK-GPS (real-time kinematic global positioning system) or a similar system. The VTOL aircraft may also make unmanned flights of long duration. For example, depending on the overall size of the VTOL aircraft and the number of batteries used, the VTOL aircraft may be able to carry out unmanned flights of over two hours.

The electronic systems disclosed herein may be realized in hardware, software, or a combination of hardware and software. Such electronic systems may be realized in a centralized fashion in at least one computing system or in a distributed fashion where different elements are spread across several interconnected computing systems. Such electronic systems may be embedded in a computer program product, which comprises all of the features enabling the implementation of the methods described herein, and which when loaded in a computer system is able to carry out these methods. "Computer program" in the present context means any expression, in any language, code, or notation, of a set of instructions intended to cause a system having an information processing capability to perform a particular function either directly or after either or both of the following: a) conversion to another language, code, or notation; b) reproduction in a different material form.

A typical implementation of such an electronic system may include an application specific integrated circuit (ASIC), a field programmable gate array (FPGA), a microprocessor (for example, an x86 or ARM based processor), or a controller (for example, a programmable interrupt controller (PIC)) loaded with corresponding software or firmware and interconnected via one or more cable assemblies or printed circuit boards.

Any of the above-described embodiments may be used alone or in combination with one another. Further, the VTOL aircraft may include additional features not described herein. While several embodiments have been shown or described, various changes and substitutions may of course be made, without departing from the spirit and scope of the invention. The invention, therefore, should not be limited, except by the following claims and their equivalents.

What is claimed is:

1. An unmanned vertical take-off and landing aircraft, comprising:
   a fuselage;
   at least one wing extending from the fuselage;
   at least one vertical stabilizer;
   a puller rotor positioned on the wing or the fuselage; and
   a pusher rotor positioned on the wing or the fuselage;
   wherein
   the pusher rotor and the puller rotor are oriented to provide thrust in forward flight and thrust in vertical flight; wherein a rotational axis of at least one of the rotors is positioned in a fixed orientation relative to the aircraft during flight; and wherein the at least one vertical stabilizer is positioned to support the aircraft when the aircraft is on land.

2. The unmanned vertical take-off and landing aircraft of claim 1 wherein the fuselage includes a payload bay positioned underneath the wing when the aircraft is in a horizontal flight orientation.

3. The unmanned vertical take-off and landing aircraft of claim 2 wherein the payload bay houses at least one of electrical components or batteries.

4. The unmanned vertical take-off and landing aircraft of claim 1 wherein the puller rotor is a first puller rotor and is positioned on the at least one wing on a first side of the fuselage, the aircraft further comprising a second puller rotor positioned on the at least one wing on a second side of the fuselage.

5. The unmanned vertical take-off and landing aircraft of claim 4 wherein the pusher rotor is positioned on the at least one wing and is aligned with a central plane of the aircraft.

6. The unmanned vertical take-off and landing aircraft of claim 5 further comprising a third puller rotor longitudinally aligned with the pusher rotor along the central plane of the aircraft, wherein:
   the pusher rotor is positioned above the wing when the third puller rotor is positioned below the wing, or
   the pusher rotor is located below the wing when the third puller rotor is positioned above the wing.

7. The unmanned vertical take-off and landing aircraft of claim 5 further comprising a third puller rotor longitudinally aligned with the pusher rotor along the central plane of the aircraft, wherein:
   the first, second, and third puller rotors are positioned below the wing when the pusher rotor is positioned above the wing, or
   the first, second, and third puller rotors are positioned above the wing when the pusher rotor is positioned below the wing.

8. The unmanned vertical take-off and landing aircraft of claim 1 wherein the at least one wing includes a first foldable portion and a second foldable portion that are each foldable between substantially horizontal and substantially vertical positions.

9. The unmanned vertical take-off and landing aircraft of claim 8 wherein the at least one wing comprises a first wing and a second wing, and wherein the first foldable portion is located on the first wing, and the second foldable portion is located on the second wing.

10. The unmanned vertical take-off and landing aircraft of claim 1 wherein the puller rotor includes a propeller that is foldable between an operational position and a stowed position.

11. The unmanned vertical take-off and landing aircraft of claim 1 wherein the puller rotor and the pusher rotor are fixed such that they are not tiltable.

12. The unmanned vertical take-off and landing aircraft of claim 1 further comprising at least two ailerons in combination with at least two corresponding elevators, or at least two elevons, positioned on a back edge of the at least one wing.

13. An unmanned vertical take-off and landing aircraft, comprising:
    a fuselage;
    at least one wing extending from the fuselage;
    a plurality of vertical stabilizers;
    a plurality of rotors positioned on at least one of the wing or the fuselage; and
    a payload bay in the fuselage positioned underneath the wing and housing at least one of electrical components or batteries; wherein
        the plurality of rotors comprises at least three puller rotors and at least one pusher rotor;
        at least one of the rotors is in a fixed orientation relative to the aircraft and positioned to provide thrust in a vertical direction in vertical flight and to provide thrust in a horizontal direction in forward flight; and wherein
        the vertical stabilizers are positioned to support the aircraft when the aircraft is on land.

14. The unmanned vertical take-off and landing aircraft of claim 13 wherein a first one of the puller rotors is longitudinally aligned with the pusher rotor along a central plane of the aircraft, wherein either:
    the pusher rotor is positioned above the wing when the first one of the puller rotors is positioned below the wing, or
    the pusher rotor is positioned below the wing when the first one of the puller rotors is positioned above the wing.

15. The unmanned vertical take-off and landing aircraft of claim 14 wherein the first one of the puller rotors is positioned on the fuselage when the first one of the puller rotors is positioned below the wing, and wherein the pusher rotor is positioned on the wing.

16. The unmanned vertical take-off and landing aircraft of claim 13 wherein the at least one wing includes a first foldable portion and a second foldable portion that are each foldable between substantially horizontal and substantially vertical positions.

17. The unmanned vertical take-off and landing aircraft of claim 16 wherein the at least one wing comprises a first wing and a second wing, and wherein a first puller rotor of the plurality of rotors is positioned underneath the first wing, and a second puller rotor of the plurality of rotors is positioned underneath the second wing, and wherein the first wing is foldable in an upward direction above the first puller rotor, and the second wing is foldable in an upward direction above the second puller rotor.

18. An unmanned vertical take-off and landing aircraft, comprising:
    a fuselage;
    at least one wing extending from the fuselage;
    at least one vertical stabilizer positioned to support the aircraft when the aircraft is on land; and
    means for transitioning the aircraft from a vertical flight orientation in which a longitudinal axis of the aircraft is generally vertical to a horizontal flight orientation in which the longitudinal axis is generally horizontal without tilting rotors on the aircraft;
    wherein the means for transitioning comprises a combination of at least one puller rotor and at least one pusher rotor, wherein the rotors are separately actuatable.

* * * * *

UNITED STATES PATENT AND TRADEMARK OFFICE
CERTIFICATE OF CORRECTION

PATENT NO. : 9,567,088 B2  
APPLICATION NO. : 14/460013  
DATED : February 14, 2017  
INVENTOR(S) : Robert Godlasky et al.

Page 1 of 1

It is certified that error appears in the above-identified patent and that said Letters Patent is hereby corrected as shown below:

On the Title Page

At item (72) Inventors: delete "Nate Ogawa" and insert -- Naoto Ogawa --, therefor.

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*